(12) United States Patent
Richardson

(10) Patent No.: US 9,861,920 B1
(45) Date of Patent: Jan. 9, 2018

(54) THREE DIMENSIONAL NANOMETER FILTERS AND METHODS OF USE

(71) Applicant: Imagine TF, LLC, Los Gatos, CA (US)

(72) Inventor: Brian Edward Richardson, Los Gatos, CA (US)

(73) Assignee: IMAGINE TF, LLC, Los Gatos, CA (US)

( * ) Notice: Subject to any disclaimer, the term of this patent is extended or adjusted under 35 U.S.C. 154(b) by 173 days.

(21) Appl. No.: 14/701,528

(22) Filed: May 1, 2015

(51) Int. Cl.
*B01D 39/20* (2006.01)
*B01D 46/00* (2006.01)
*B01D 29/00* (2006.01)
*B01D 29/56* (2006.01)
*C23F 1/00* (2006.01)

(52) U.S. Cl.
CPC ......... *B01D 39/20* (2013.01); *B01D 29/0093* (2013.01); *B01D 29/56* (2013.01); *B01D 39/2068* (2013.01); *B01D 46/0001* (2013.01); *B01D 46/0023* (2013.01); *C23F 1/00* (2013.01)

(58) Field of Classification Search
CPC ................ B01D 39/20; B01D 39/2068; B01D 46/2418; B01D 46/2425; B01D 46/2451; B01D 46/2474; B01D 46/40; B01D 46/0001; B01D 46/0023
USPC .......................................................... 55/523
See application file for complete search history.

(56) References Cited

U.S. PATENT DOCUMENTS

| | | |
|---|---|---|
| 1,977,174 A | 10/1934 | Crawford |
| 3,250,396 A | 5/1966 | Armstrong et al. |
| 3,335,946 A | 8/1967 | Putterlik |
| 3,884,805 A | 5/1975 | Bagdasarian et al. |
| 3,948,779 A | 4/1976 | Jackson |
| 4,267,045 A | 5/1981 | Hoof |
| 4,410,430 A | 10/1983 | Hagler, Jr. |
| 4,423,090 A * | 12/1983 | Hammond, Jr. ... B01D 39/2075 427/181 |

(Continued)

FOREIGN PATENT DOCUMENTS

| | | |
|---|---|---|
| CN | 203139755 U | 8/2013 |
| CN | 106029202 A | 10/2016 |

(Continued)

OTHER PUBLICATIONS

Patent Cooperation Treaty Application No. PCT/US2016/040878, "International Search Report" and "Written Opinion of he International Searching Authority," Sep. 19, 2016, 11 pages.

(Continued)

*Primary Examiner* — Robert Clemente
(74) *Attorney, Agent, or Firm* — AMPACC Law Group, LLP; Keith Kline

(57) ABSTRACT

Three dimensional nanoparticle filters are provided herein. In one embodiment a filter device includes a base material, alternating layers of sacrificial material between layers of structural material being deposited onto the base material to create a layered base material, and filter sidewalls etched into the deposited alternating layers of the layered base material to remove the layers of sacrificial material between the layers of structural material to form filter slots in the filter sidewalls as well as create channels between the filter sidewalls, where a size of the filter slots is selectable based on a thickness of the layers of sacrificial material utilized.

15 Claims, 18 Drawing Sheets

(56) References Cited

U.S. PATENT DOCUMENTS

| | | |
|---|---|---|
| 4,430,232 A | 2/1984 | Doucet |
| 4,478,769 A | 10/1984 | Pricone et al. |
| 4,486,363 A | 12/1984 | Pricone et al. |
| 4,601,861 A | 7/1986 | Pricone et al. |
| 4,668,558 A | 5/1987 | Barber |
| 4,797,175 A * | 1/1989 | Ellion et al. ............ B01D 46/40 216/41 |
| 4,842,739 A | 6/1989 | Tang |
| 4,842,794 A | 6/1989 | Hovis et al. |
| 4,891,120 A | 1/1990 | Sethi et al. |
| 4,902,420 A | 2/1990 | Pall et al. |
| 4,960,449 A * | 10/1990 | Yonushonis ....... B01D 39/2093 55/523 |
| 4,971,769 A * | 11/1990 | Haerle ............... B01D 39/2075 422/171 |
| 5,009,857 A * | 4/1991 | Haerle ............... B01D 39/2075 422/177 |
| 5,100,551 A | 3/1992 | Pall et al. |
| 5,200,073 A | 4/1993 | Steere et al. |
| 5,204,690 A | 4/1993 | Lorenze, Jr. et al. |
| 5,207,962 A | 5/1993 | Hovis et al. |
| 5,262,107 A | 11/1993 | Hovis et al. |
| 5,290,447 A | 3/1994 | Lippold |
| 5,505,852 A | 4/1996 | van Rossen |
| 5,552,046 A | 9/1996 | Johnston et al. |
| 5,568,819 A | 10/1996 | Gentry et al. |
| 5,645,704 A | 7/1997 | Axtman |
| 5,985,164 A | 11/1999 | Chu et al. |
| 6,273,938 B1 | 8/2001 | Fanselow et al. |
| 6,274,035 B1 | 8/2001 | Yuan et al. |
| 6,284,072 B1 | 9/2001 | Ryan et al. |
| 6,306,300 B1 | 10/2001 | Harding et al. |
| 6,346,192 B2 | 2/2002 | Buhr et al. |
| 6,375,870 B1 | 4/2002 | Visovsky et al. |
| 6,471,746 B2 | 10/2002 | Hagglund et al. |
| 6,524,488 B1 | 2/2003 | Insley et al. |
| 6,589,317 B2 | 7/2003 | Zhang et al. |
| 6,632,357 B1 | 10/2003 | Barger et al. |
| 6,685,833 B2 | 2/2004 | Lippold |
| 6,685,841 B2 | 2/2004 | Lopez et al. |
| 6,746,890 B2 | 6/2004 | Gupta et al. |
| 6,748,978 B2 | 6/2004 | Pezzuto et al. |
| 6,752,889 B2 | 6/2004 | Insley et al. |
| 6,761,962 B2 | 7/2004 | Bentsen et al. |
| 6,827,906 B1 | 12/2004 | Bjornson et al. |
| 6,872,302 B2 | 3/2005 | Aste |
| 6,915,566 B2 | 7/2005 | Abbott et al. |
| 6,936,086 B2 | 8/2005 | Harkonen et al. |
| 7,032,426 B2 | 4/2006 | Durney et al. |
| 7,048,848 B2 | 5/2006 | Assion |
| 7,081,208 B2 | 7/2006 | McCullough et al. |
| 7,104,406 B2 | 9/2006 | Chen et al. |
| 7,122,068 B2 | 10/2006 | Tate et al. |
| 7,163,733 B2 | 1/2007 | Bourdelais et al. |
| 7,217,562 B2 | 5/2007 | Cao et al. |
| 7,223,364 B1 | 5/2007 | Johnston et al. |
| 7,238,255 B2 | 7/2007 | Derand et al. |
| 7,282,148 B2 | 10/2007 | Dalton et al. |
| 7,323,105 B1 | 1/2008 | Janikowski et al. |
| 7,425,227 B1 | 9/2008 | Hutchison et al. |
| 7,442,303 B2 | 10/2008 | Jacobson |
| 7,531,120 B2 | 5/2009 | Van Rijn et al. |
| 7,569,139 B2 | 8/2009 | Mihlbauer et al. |
| 7,588,619 B2 | 9/2009 | Chilton et al. |
| 7,645,383 B2 | 1/2010 | Kadel et al. |
| 7,784,619 B2 | 8/2010 | Jacobson |
| 7,857,978 B2 | 12/2010 | Jensen et al. |
| 7,901,758 B2 | 3/2011 | Rasmussen |
| 7,922,795 B2 | 4/2011 | Striemer et al. |
| 7,959,780 B2 | 6/2011 | Hawkins et al. |
| 7,988,840 B2 | 8/2011 | Huang et al. |
| 8,025,854 B2 | 9/2011 | Ohman et al. |
| 8,083,941 B2 | 12/2011 | Chien |
| 8,179,381 B2 | 5/2012 | Frey et al. |
| 8,186,913 B2 | 5/2012 | Toner et al. |
| 8,197,775 B2 | 6/2012 | Johnston et al. |
| 8,273,245 B2 | 9/2012 | Jovanovic et al. |
| 8,277,759 B2 | 10/2012 | Sundberg et al. |
| 8,282,799 B2 | 10/2012 | Huang et al. |
| 8,297,449 B2 | 10/2012 | Afzali-Ardakani et al. |
| 8,304,230 B2 | 11/2012 | Toner et al. |
| 8,328,022 B2 | 12/2012 | Mbadinga-Mouanda et al. |
| 8,679,336 B2 | 3/2014 | Hongo et al. |
| 2002/0060183 A1 | 5/2002 | Paul et al. |
| 2002/0125192 A1 | 9/2002 | Lopez et al. |
| 2002/0185003 A1 | 12/2002 | Potter |
| 2003/0104170 A1 | 6/2003 | Johnston et al. |
| 2003/0118781 A1 | 6/2003 | Insley et al. |
| 2004/0159319 A1 * | 8/2004 | Kadel ................. B05B 15/008 128/200.18 |
| 2005/0179150 A1 | 8/2005 | Bharadwaj et al. |
| 2006/0219627 A1 | 10/2006 | Rodgers et al. |
| 2007/0020772 A1 | 1/2007 | Cao et al. |
| 2007/0151920 A1 | 7/2007 | Kay |
| 2007/0246433 A1 | 10/2007 | Zuberi |
| 2007/0251867 A1 | 11/2007 | Mihlbauer et al. |
| 2008/0012151 A1 | 1/2008 | Kemppainen et al. |
| 2008/0014410 A1 | 1/2008 | Johnston et al. |
| 2008/0296238 A1 * | 12/2008 | Haldopoulos ......... B01D 25/26 210/806 |
| 2009/0102094 A1 | 4/2009 | Golden et al. |
| 2009/0120874 A1 | 5/2009 | Jensen et al. |
| 2009/0149345 A1 | 6/2009 | Nishi et al. |
| 2010/0216126 A1 | 8/2010 | Balachandran et al. |
| 2010/0317132 A1 | 12/2010 | Rogers et al. |
| 2011/0100900 A1 | 5/2011 | Drury et al. |
| 2011/0240476 A1 | 10/2011 | Wang et al. |
| 2012/0006760 A1 | 1/2012 | Toner et al. |
| 2012/0037544 A1 | 2/2012 | Lane et al. |
| 2012/0244311 A1 | 9/2012 | Manninen |
| 2012/0244314 A1 | 9/2012 | Scheibner et al. |
| 2012/0261331 A1 | 10/2012 | Ter Horst et al. |
| 2012/0261333 A1 | 10/2012 | Moran et al. |
| 2012/0267249 A1 | 10/2012 | Cotte et al. |
| 2012/0273990 A1 | 11/2012 | O'Donnell et al. |
| 2013/0078163 A1 | 3/2013 | Chung et al. |
| 2014/0221544 A1 | 8/2014 | Lichtenhan et al. |
| 2014/0224658 A1 | 8/2014 | Richardson |
| 2015/0367257 A1 | 12/2015 | Richardson |
| 2016/0067634 A1 | 3/2016 | Richardson |
| 2016/0236120 A1 | 8/2016 | Richardson |

FOREIGN PATENT DOCUMENTS

| | | |
|---|---|---|
| EP | 0639223 B1 | 2/1995 |
| EP | 1196242 A1 | 4/2002 |
| EP | 1197255 A1 | 4/2002 |
| EP | 1254689 B1 | 11/2002 |
| EP | 1449585 A1 | 8/2004 |
| EP | 2505047 A2 | 10/2012 |
| WO | WO2011066055 A2 | 6/2011 |
| WO | WO2014116183 A1 | 7/2014 |
| WO | WO2015105524 A1 | 7/2015 |
| WO | WO2015199663 A1 | 12/2015 |
| WO | WO2016037150 A1 | 3/2016 |
| WO | WO2016133929 A1 | 8/2016 |

OTHER PUBLICATIONS

International Search Report and Written Opinion dated Aug. 28, 2014 in Application No. PCT/US2014/036439, filed May 1, 2014.
International Search Report and Written Opinion dated Dec. 1, 2014 in Application No. PCT/US2014/043942, filed Jun. 24, 2014.
International Search Report and Written Opinion dated Dec. 17, 2015 in Application No. PCT/US2015/048723, filed Sep. 4, 2015.
International Search Report and Written Opinion dated May 19, 2016 in Application No. PCT/US2016/018119, filed Feb. 16, 2016, 10 pages.

* cited by examiner

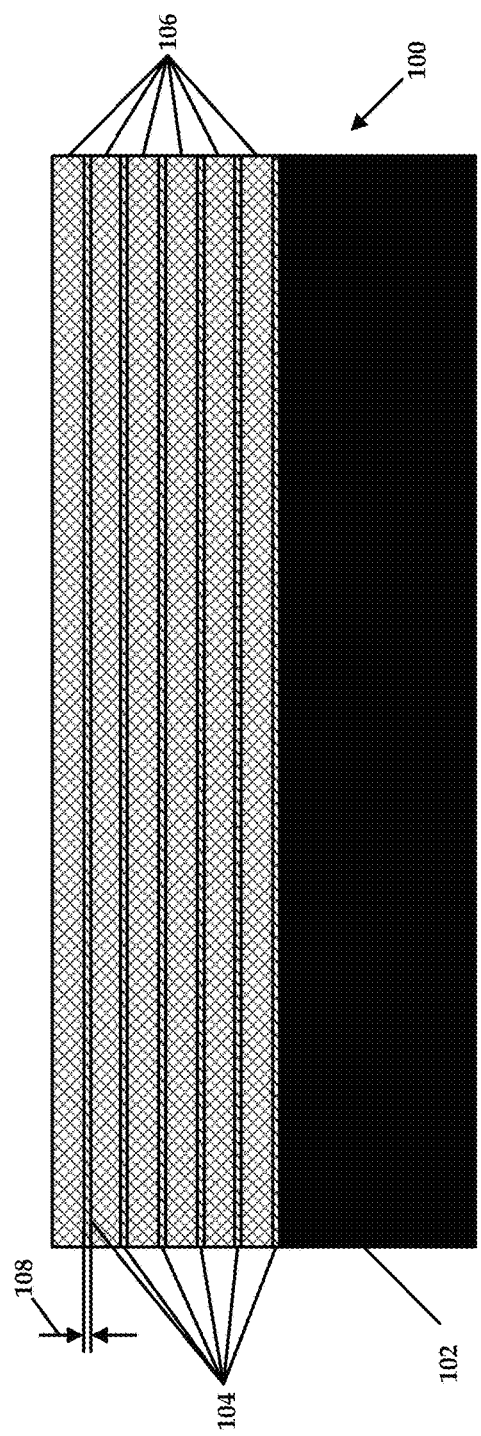
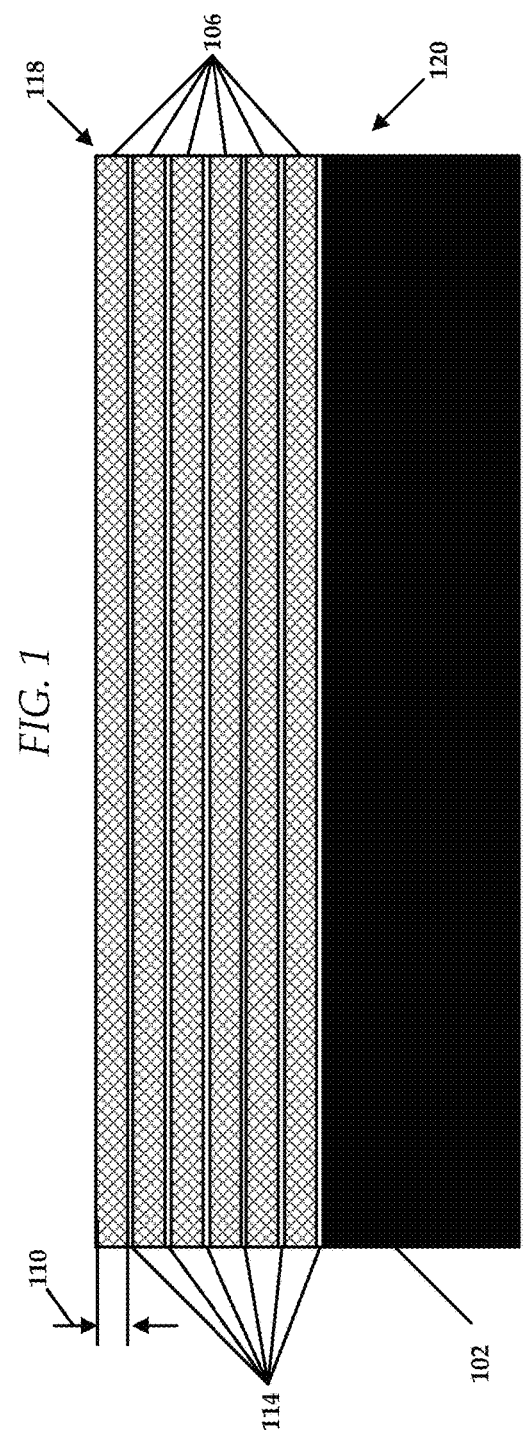

THREE DIMENSIONAL NANOMETER FILTERS AND METHODS OF USE

CROSS REFERENCE TO RELATED APPLICATIONS

This application claims the priority benefit of U.S. Provisional Application Ser. No. 61/996,207, filed on May 1, 2014, and U.S. Provisional Application Ser. No. 61/998,772, filed on Jul. 7, 2014, the disclosures of which are hereby incorporated by reference herein in their entirety.

FIELD OF THE PRESENT TECHNOLOGY

The present technology relates generally to fluid filters, and more specifically, but not by limitation, to three dimensional nanometer filters, methods of production, and methods of use.

SUMMARY OF THE PRESENT TECHNOLOGY

According to some embodiments, the present technology can be implemented as a filter substrate, comprising: (a) a base material; (b) deposited alternating layers of sacrificial material between layers of structural material disposed onto the base material creating a layered base material; and (c) filter sidewalls etched into the deposited alternating layers of the layered base material, where layers of sacrificial material between the layers of structural material have been removed to form filter slots in the filter sidewalls, and channels that extend between the filter sidewalls, wherein a size of the filter slots is selectable based on a thickness of the layers of sacrificial material utilized.

One general aspect of the present technology includes a method for creating a filter substrate, including: providing a base material; depositing alternating layers of sacrificial material between layers of structural material to create a layered base material; and etching filter sidewalls into the deposited alternating layers of the layered base material, where etching removes the layers of sacrificial material between the layers of structural material to form filter slots in the filter sidewalls as well as create channels between the filter sidewalls, where a size of the filter slots is selectable based on a thickness of the layers of sacrificial material utilized.

One general aspect of the present technology includes a filter substrate having a base material. The filter substrate also includes a continuous filter sidewall disposed on the base material, the continuous filter sidewall forming alternating channels with inlet sections proximate a top of the filter substrate and outlet sections proximate a bottom of the filter substrate, the continuous filter sidewall being fabricated so as to comprise filtering elements, wherein fluid entering the inlet sections passes through the filtering elements to remove particulates and a filtered fluid exits the outlet section Other embodiments of this aspect include methods for manufacturing the filter substrate as well as methods of use.

One general aspect of the present technology includes a filter panel comprising a plurality of filter substrates layered on top of each other, where each of the filter substrates includes a base material. The filter panel also includes a continuous filter sidewall disposed on the base material, the continuous filter sidewall forming alternating channels with inlet sections proximate a top of the filter panel and outlet sections proximate a bottom of the filter panel, the continuous filter sidewall being fabricated from a porous material such that fluid entering the inlet sections passes through the continuous filter sidewall to remove particulates and a filtered fluid exits the outlet section.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 1 is a cross section view of a filtering object that can be used to create a filter substrate.

FIG. 2 is a cross sectional view of the filtering object after an etching process has removed sacrificial material.

DESCRIPTION OF EXEMPLARY EMBODIMENTS

Figure 3:
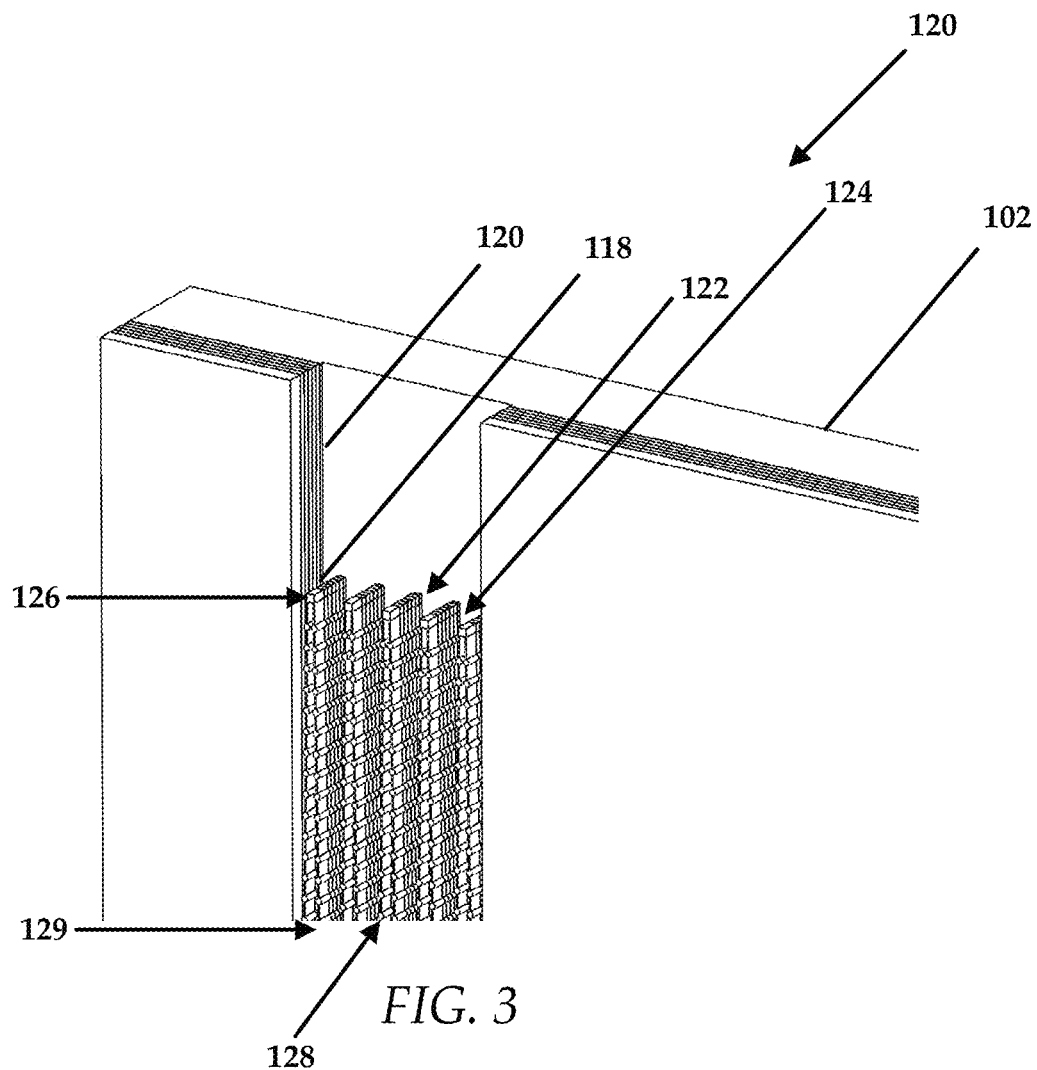
FIG. 3 is a perspective view of an etching process where a filter sidewall is crated that includes a plurality of filter slots.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally, the present technology is directed to three dimensional nanometer filters that are used to remove particulate matter from a fluid, such as a liquid or gas. In some embodiments, the filters are designed to accurately filter fluid borne particles with single digit nanometer range. The filters of the present technology can advantageously be cleaned and reused as needed.

The filter devices can be created from a plurality of filter substrates that are stacked, rolled, or otherwise joined together.

Advantageously, filters of the present technology can be used in water treatment processes, gas and liquid processing, as well as air purification.

FIGS. 1 and 2 collectively illustrate a process for creating a three dimensional filter of the present technology. FIG. 1 illustrates layered object 100 that comprises a base material 102, a plurality of sacrificial layers 104, and a plurality of structural layers 106. The layered object 100 is created by selecting the base material 102. In some embodiments, the base material 102 comprises a material selected from any of silicon, quartz, borosilicate glass, silicone dioxide, glass, Eagle XG™ glass, silicon nitride, silicon carbon, aluminum, titanium, chromium, molybdenum, tungsten, copper, gold, a photoresist, a polymer, or any combination thereof.

The layered object creates a three dimensional structures that can filter a fluid and remove particular matter therefrom. In some embodiments, the three dimensional structures are referred to as filter sidewalls, the creation of which will be described in greater detail below.

The plurality of sacrificial layers 104 can include any suitable material such as silicon dioxide. The plurality of structural layers 106 can include any suitable material such as amorphous silicon.

The base material 102 can be provided in a sheet form to allow for large scale filter manufacturing. The base material 102 can also be provided in wafer sizes or other sizes as desired.

The layered object 100 is created by a series of depositing operations that includes depositing material onto the base material 102. In one embodiment, the layered object 100 is created by depositing alternating layers of sacrificial material between layers of structural material to create a layered base material.

In some embodiments, the alternating layers begin with a sacrificial layer, followed by a structural layer. Additional alternating layers of sacrificial material and structural material are applied up to a total of approximately 20 layers. It will be understood that any number of layers can be created.

In general, each of the layers can have a thickness that is defined by how much material is deposited for any given layer.

According to some embodiments, each of the sacrificial layers 104 has a thickness that is approximately five nanometers. An example thickness 108 of a sacrificial layer is illustrated. Each of the structural layers 106 has a thickness that is approximately one hundred nanometers. An example thickness 110 of a structural layer is illustrated.

To be sure, the thickness of the sacrificial layers 104 defines the size of the particles that can be excluded or filtered by the filter device created from the layered object 100. Additional details regarding this relationship will be described in greater detail below.

Referring now to FIG. 2, once the layered object 100 is assembled, the layered object 100 is subjected to an etching process to create a filter substrate 120. To be sure, FIG. 2 illustrates a side view of a portion of a filter substrate 120, illustrating in detail a filter sidewall, which is described in greater detail with respect to FIG. 3. A portion of the filter substrate 120 in the etching process is illustrated in FIG. 3.

The etching process removes the sacrificial layers 104, leaving the structural layers 106 in place, which creates filter slots 114 (e.g., filter features). The filter slots 114 have a thickness that corresponds to the original thickness of the sacrificial layers 104. The filter slots 114 are used to selectively remove particulate matter from a fluid, as will be described in greater detail below.

Processes utilized to etch the layered object 100 include, but are not limited to wet etching, dry etching, laser etching, sintering, or cutting with a tool or die.

Referring now to FIG. 3, in addition to removing sacrificial layers 104, the etching process can also be utilized to create filter sidewalls. In one example, a filter sidewall 118 is created by an etching process. In one embodiment, the filter sidewall 118 is a continuous sidewall traversing a substantially zig-zag pattern. The filter sidewall 118 defines a plurality of substantially v-shaped channels 122. The substantially v-shaped channels 122 are disposed in an alternating manner such that a every other wide portion, such as wide portion 124, of the substantially v-shaped channels 122 are located proximate a top 126 of the filter substrate 120. The other wide portions, such as wide portion 128 are located proximate a bottom 129 of the filter substrate 120.

To be sure, FIG. 3 illustrates one example configuration of a filter sidewall and filter channels. The filter sidewall can be created to have any desired shape, which will also result in unique filter channel shapes as well. Indeed, a filter substrate can be created with filter sidewalls of any configuration, the shape and size of which can depend upon the desired operational requirements for the filter substrate, such as what type of fluid is being filtered, the size and shape of particulates in the fluid, a targeted filtering time (e.g., how long it should take to process the fluid), as well as other operational requirements.

Figure 4:
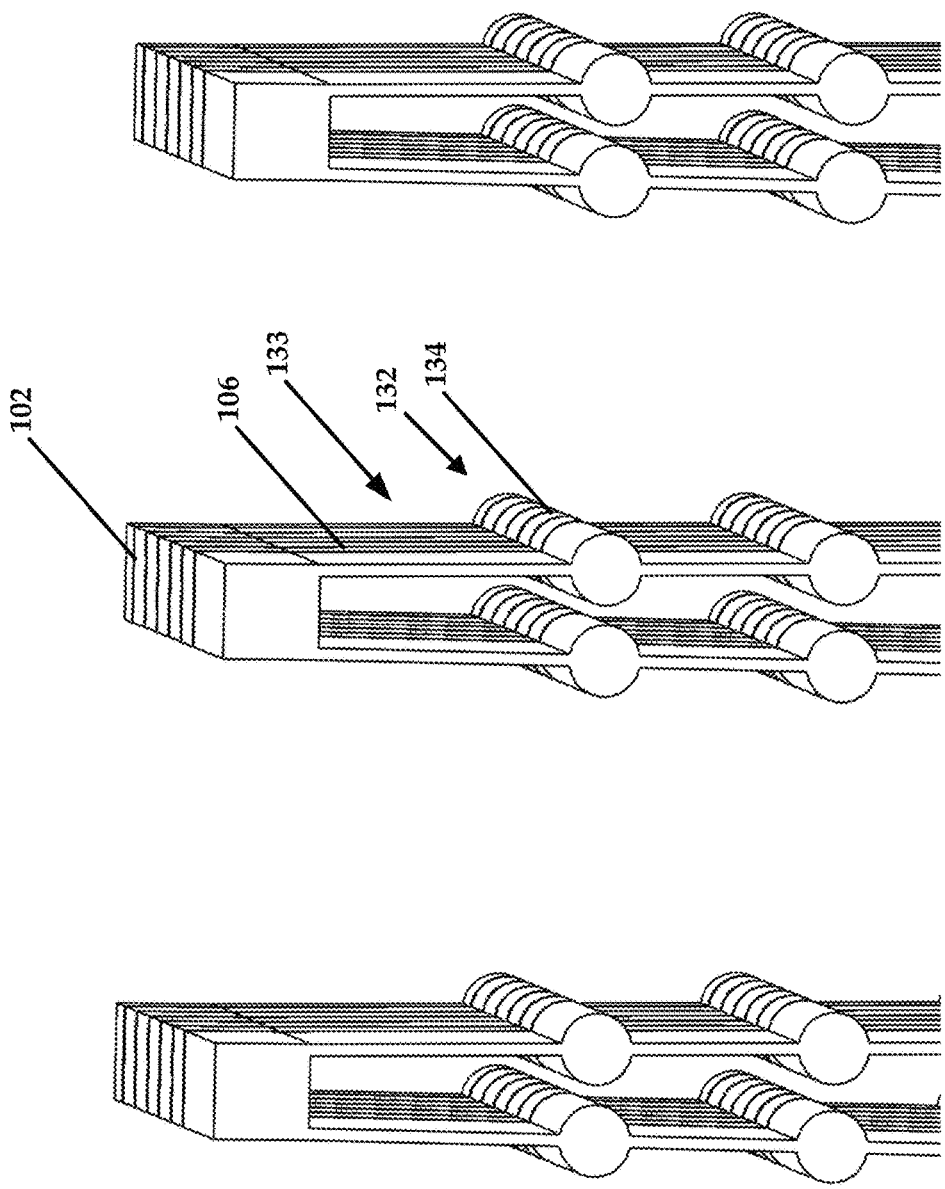
FIG. 4 is a close up perspective view of a filter sidewall.

FIG. 4 is a close up view of a section of a filter sidewall 118. The filter sidewall 118 is defined by a plurality of posts, such as post 132. The plurality of posts are disposed on the base material 102 and form cylindrical sections, such as cylindrical section 134. The cylindrical section 134 is built when layers of sacrificial material and structural material are applied to the post 132. Additional details regarding the use of posts can be found below.

To be sure, the etching process can be used to remove a portion of the structural layers, but a significant amount of the structural material remains. In some embodiments, some of the sacrificial material remains at the posts for structure removed at the post sections. This creates filter features that are approximately five nm wide, using the examples provided above. Again, the filtering features (e.g., filter slots) can be fine-tuned to any desired thickness/width.

Indeed, in FIGS. 3 and 4, the sacrificial material remains in the post sections such as post 132 in order to maintain spacing between the structural layers. The sacrificial material can be removed from the sacrificial layers 104 in the narrow area 133 to create the fluid filtering slots/pores.

In some embodiments, the base material 102 and/or the structural layers 106 can be coated with a layer of additional material, which can serve one or two functions. Firstly, the additional material layer can reduce the thickness/width of the filter slots. Secondly, the additional material layer can be used to enhance the properties of the filter (i.e., chemical attraction). Many types of coatings can be applied and one of ordinary skill in the art can engineer the coatings for filtering.

Figure 5:
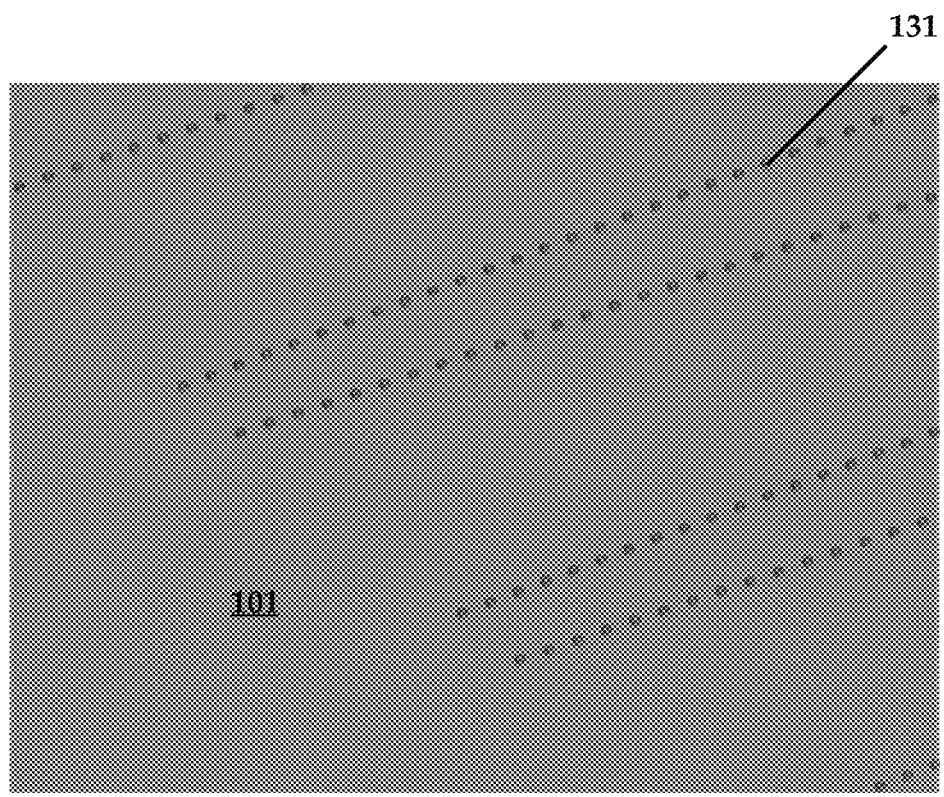
FIG. 5 is a perspective view that illustrates the deposition of posts onto a base material.
Figure 6:
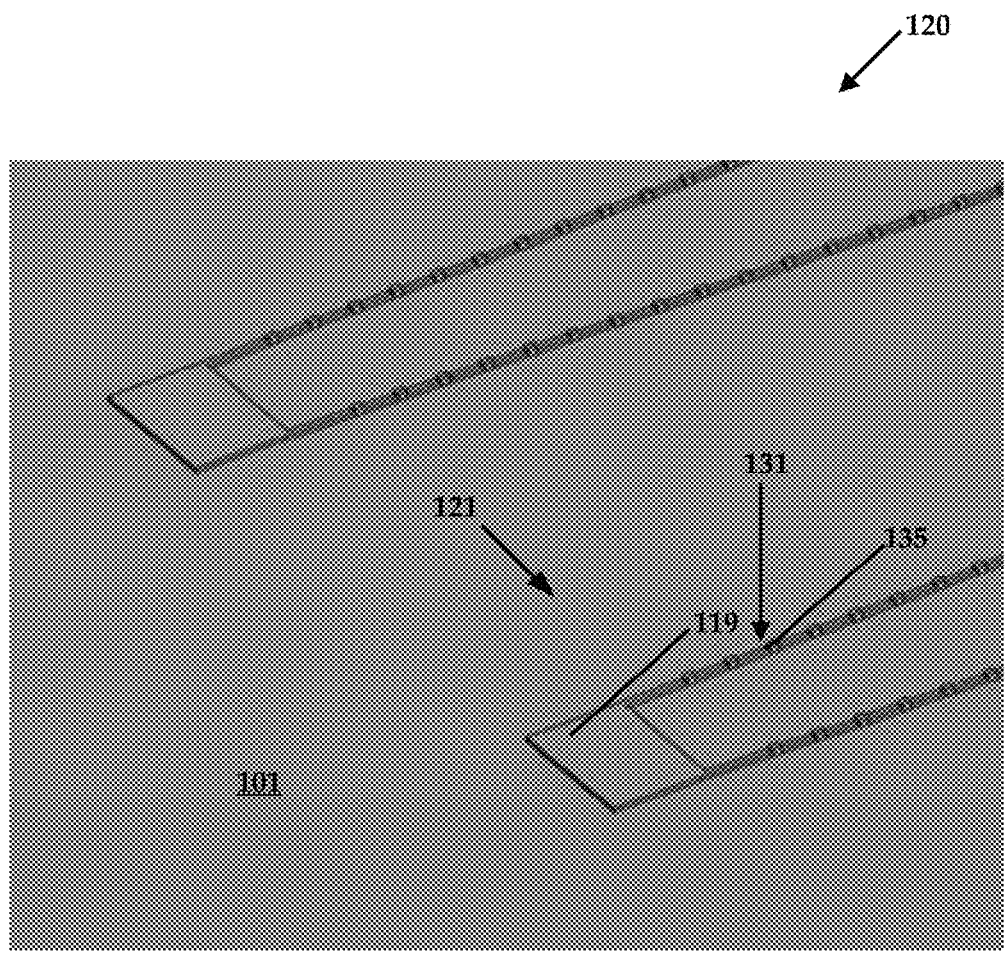
FIG. 6 is a perspective view that illustrates a layering of sacrificial and structural material onto the posts of FIG. 5, as well as the etching of the filter sidewall.
Figure 7:
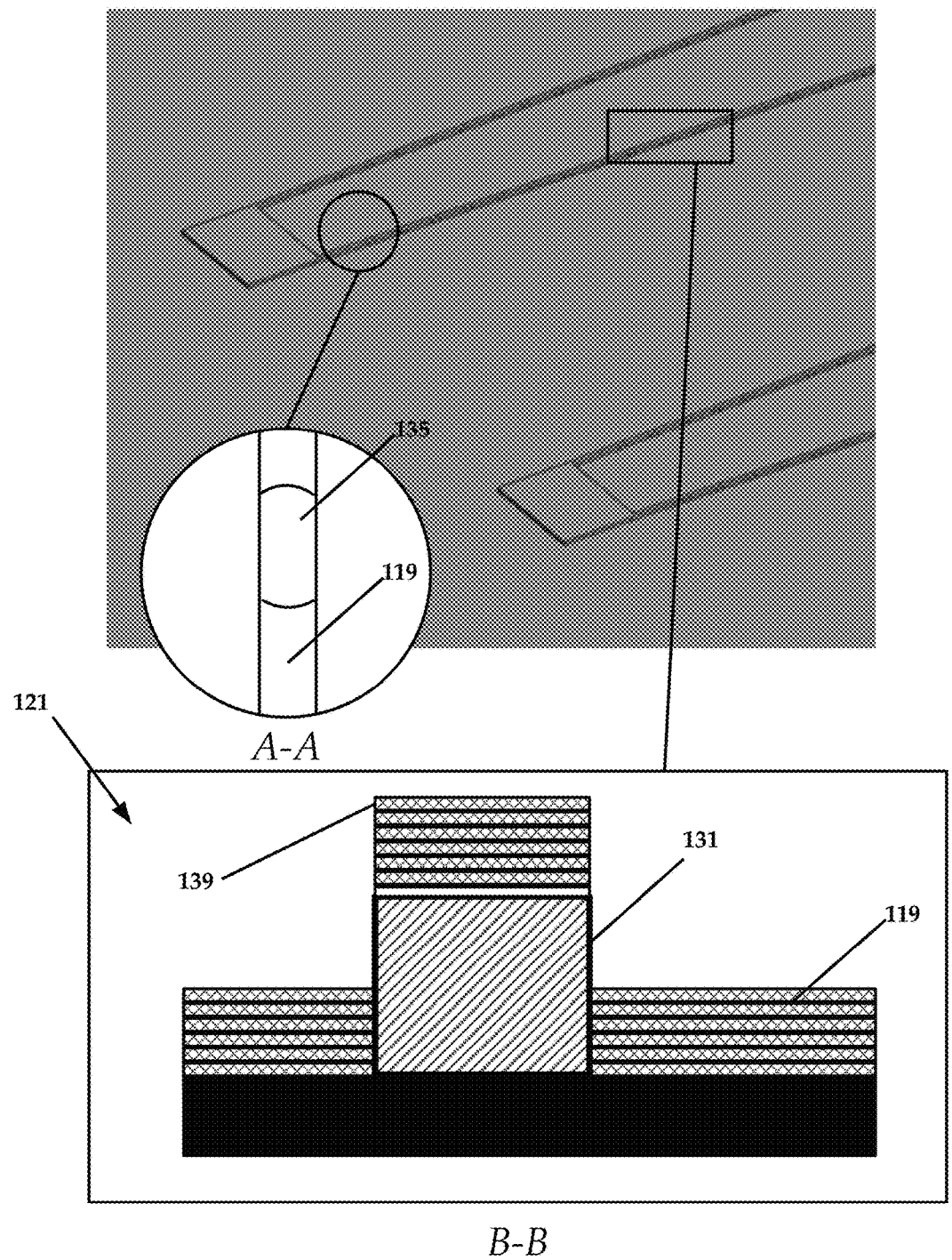
FIG. 7 is a perspective view that illustrates the etching of cylindrical sections of the filter sidewall to remove side portions of the cylindrical sections. A section view A-A of an etched cylindrical section is illustrated. A section view B-B of a planarized section of the filter sidewall is illustrated.

FIGS. 5-7 collectively illustrate another example process for creating another filter substrate 121. In FIG. 5, a plurality of posts, such as post 131 are disposed on a substrate (e.g., base) material 101. Indeed, the substrate material 101 can comprise any material described in the other embodiments. The posts 131 can be created from a non-sacrificial material such as silicon.

Alternating layers of sacrificial and structural materials can be applied to the posts 131 and the substrate material 101. FIG. 6 illustrates the filter substrate 121 after etching of the layers to create the filter sidewall 119. To be sure, the cylindrical sections 135 are present at this stage.

In FIG. 7, side portions of the cylindrical sections 135 are etched away, along with the sacrificial layers and portions of the structural layers. Detailed view A-A is a top down view of an example cylindrical section 135 with etched away sides.

Also, the tops of the posts, such as top 139 of post 131, are planarized to be co-linear with the top surface of the structural layer 119. In this case the posts provide structure that maintains spacing of the structural layers.

Figure 8:
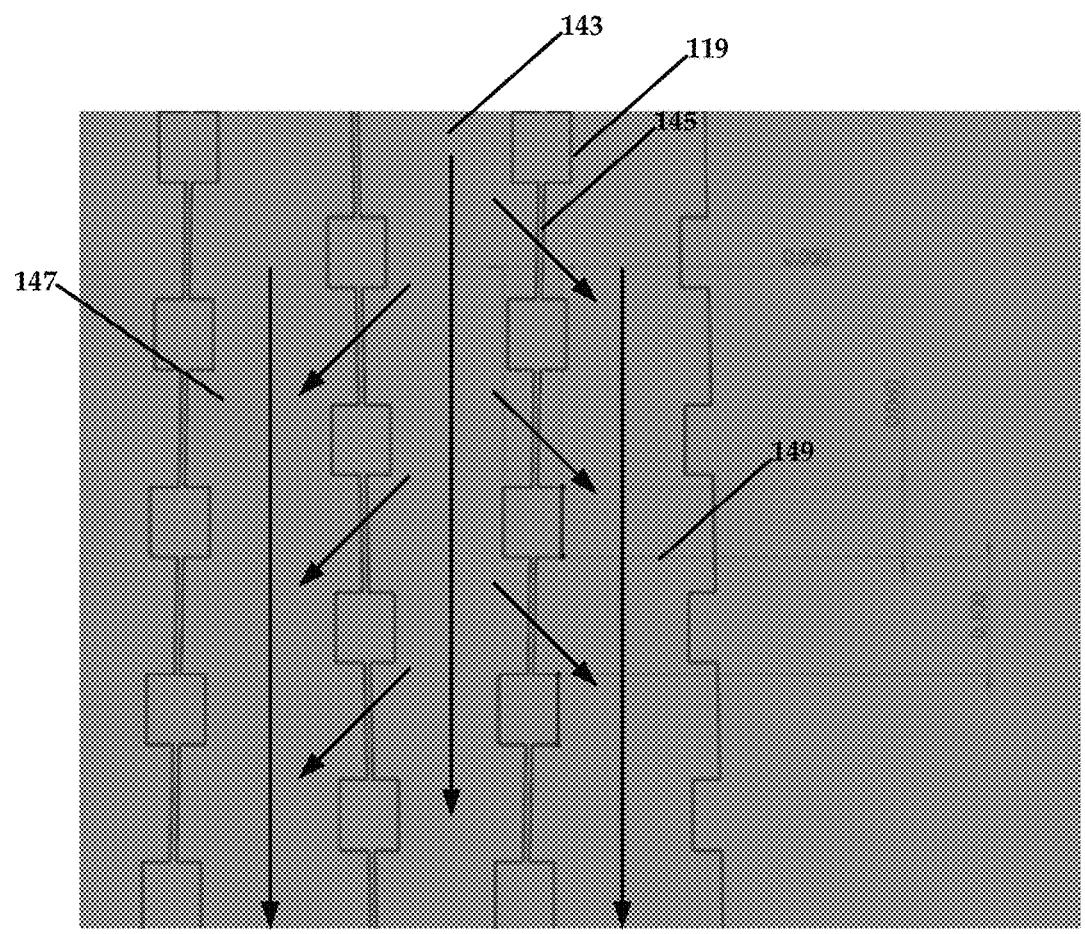
FIG. 8 is cross sectional top down of a filter substrate for use in accordance with the present technology.
Figure 9:
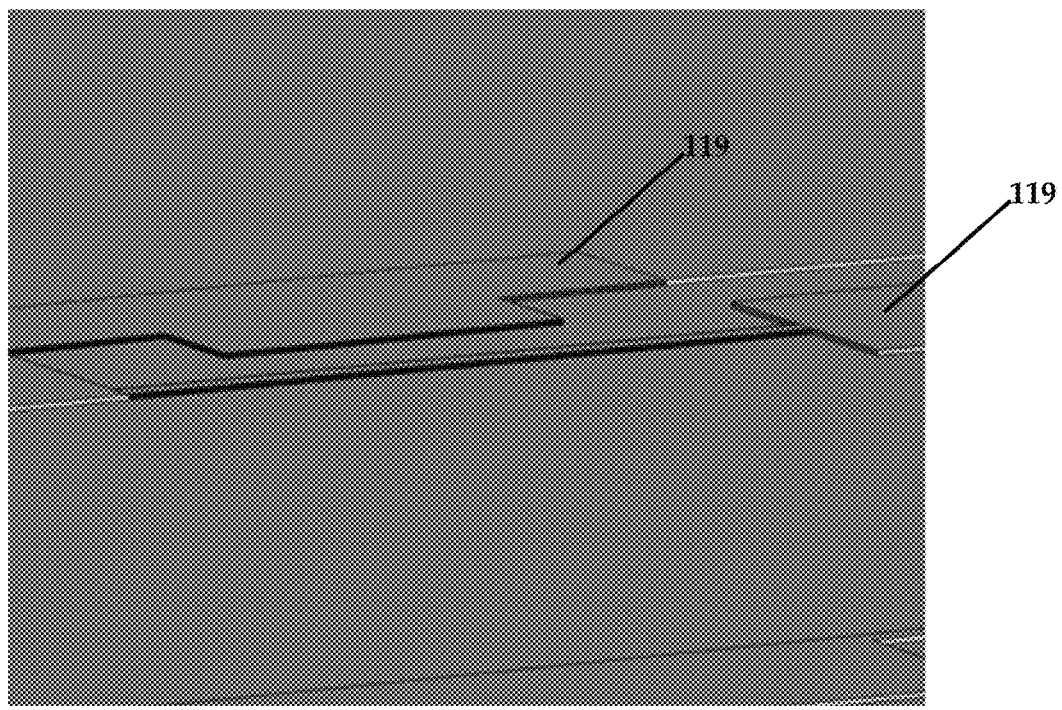
FIG. 9 is a perspective view of the filter substrate of FIG. 8.

FIG. 8 illustrates a top down view of a plurality of filter sidewalls, such as filter sidewall 119. FIG. 9 is a perspective view of the filter sidewalls, such as two filter sidewalls (both labeled 119) after the etching process is complete.

Also, FIG. 8 illustrates an example flow of fluid through the filter sidewalls. The arrows in FIG. 8 illustrate a main flow of fluid entering a main input channel 143. The fluid entering the main input channel 143 is filtered as it passes through the narrow sections, such as narrow section 145 of each of the filter sidewalls, such as filter sidewall 119. To be sure, the sacrificial material has been removed from the narrow sections to allow fluid to flow through the slots/pores to remove particulates. The fluid flows through the main input channel 143 and through the narrow sections similarly blood dispersing into veins. The fluid can also flow out of output channels 147 and 149. The fluid exiting the output channels 147 and 149 will be filtered through its transit through the filter substrates of a filter device.

Figure 21:
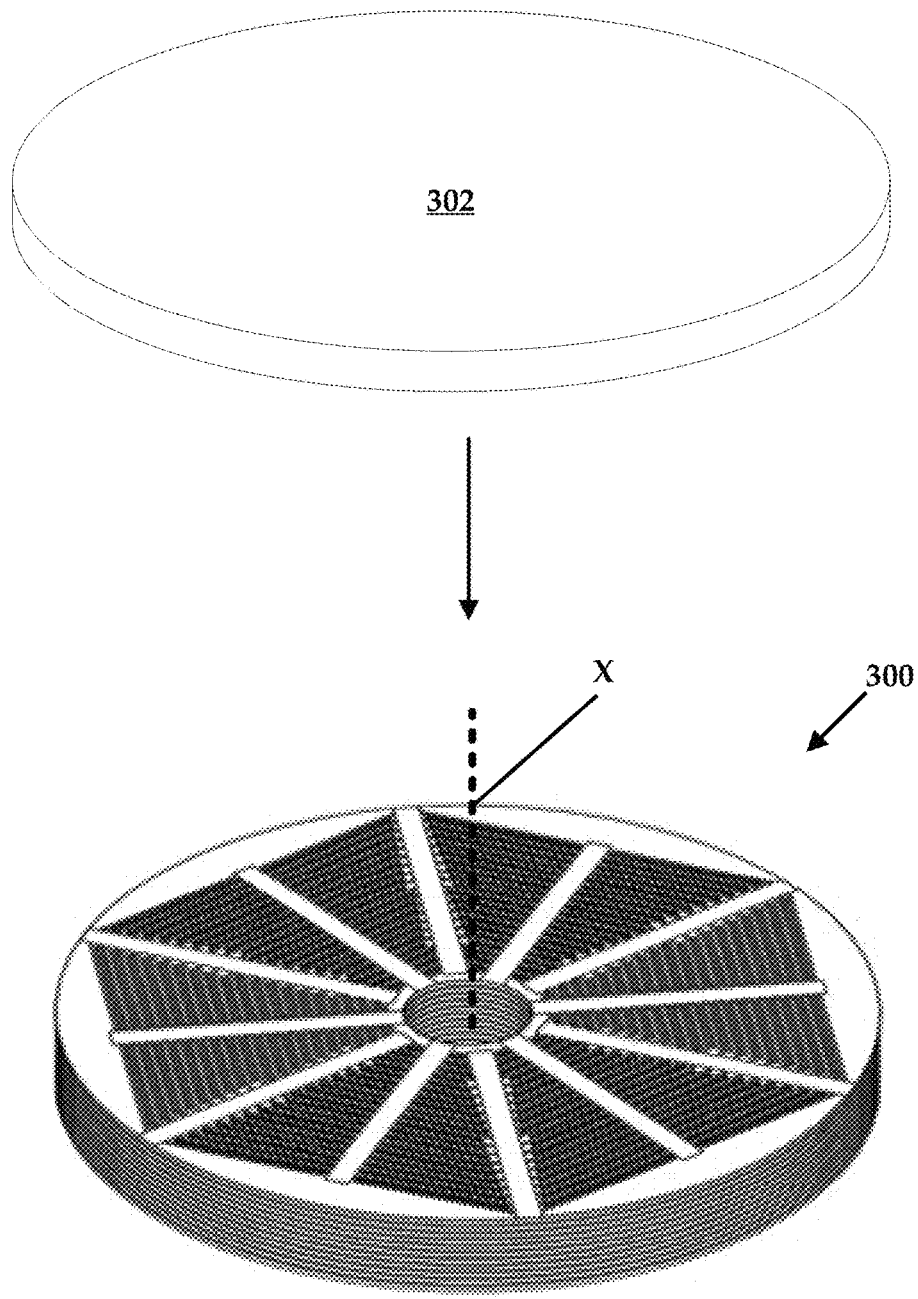
FIG. 21 illustrates an example filter device that is comprised of a plurality of the filter substrates of FIGS. 18-20. A cover layer is also illustrated for use with the filter device.

A cover plate is not illustrated in this embodiment, although layers of filter substrate 121 can function as a cover plate. To be sure, each filter device created from one or more filter substrates functions when a covering or cover plate of some type is employed to ensure that the fluid remains in contact with the filter substrates. An example cover plate is illustrated in FIG. 21, although the actual shape and configuration of the cover plate utilized will depend on the shape and size of the filter device created from the filter substrates.

Figure 10:
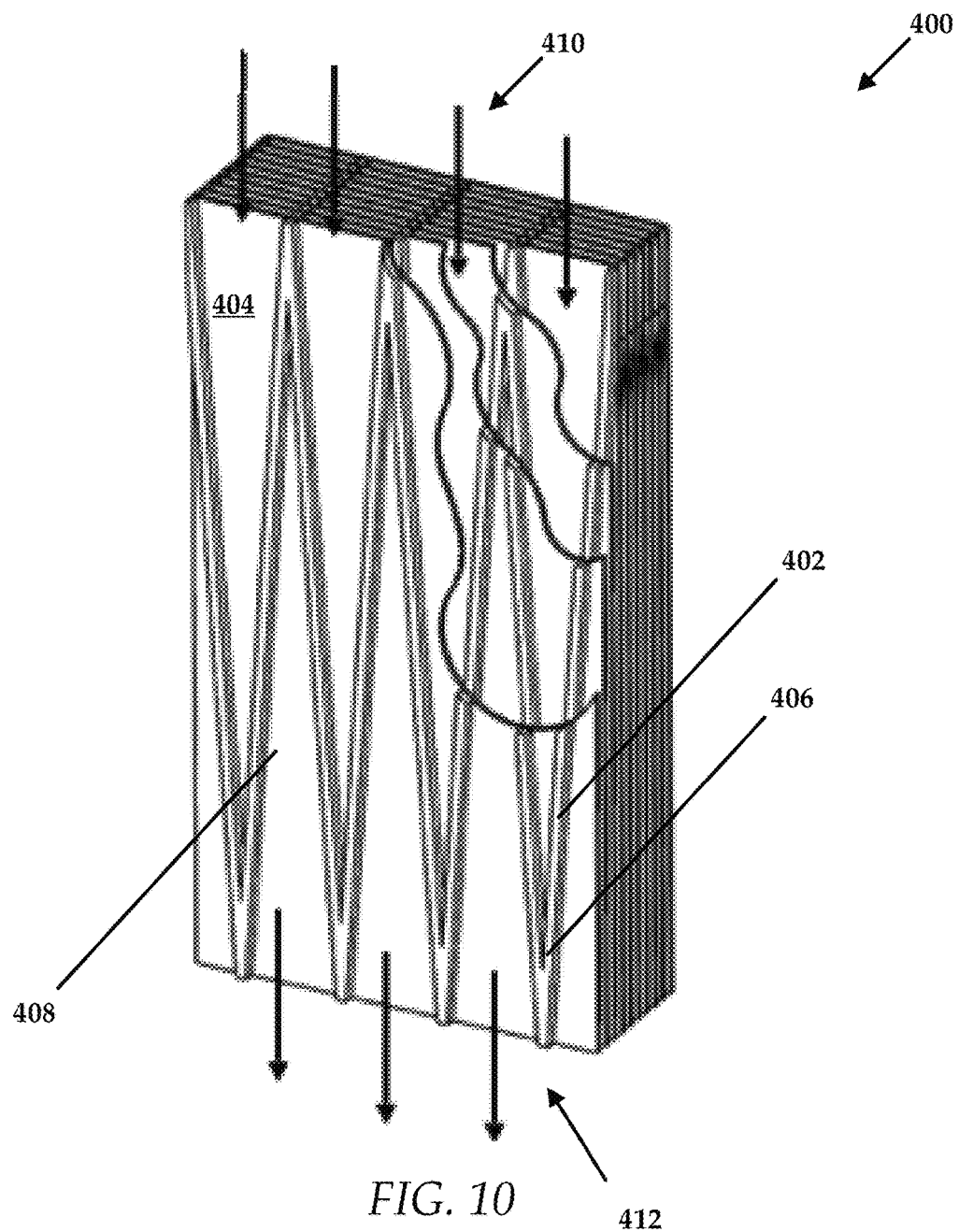
FIGS. 10-11 collectively another example filter device that is manufactured using a porous material to filter a fluid.
Figure 11:
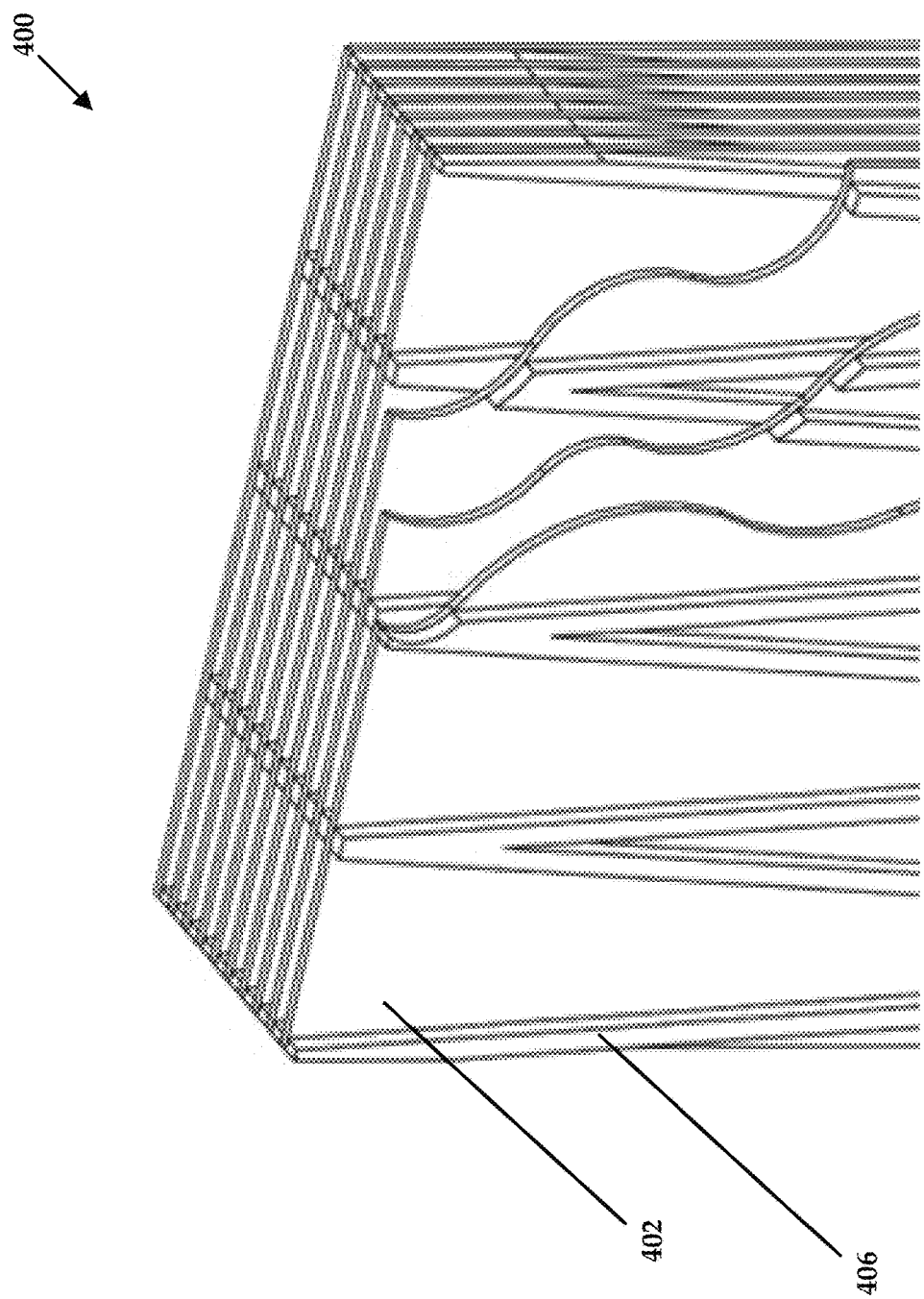

FIGS. 10 and 11 collectively illustrate another example filter device 400 that is created from a plurality of filter substrates, such as filter substrate 402. The filter substrate 402 is created with a base material or backing 404. The base material or backing 404 can be manufactured from, for example, a polycarbonate plastic, a polyester plastic, other suitable plastic or polymeric material, a metal, an alloy of metals, a solid or porous ceramic material, a glass, or combinations thereof.

In one embodiment, the base material 404 is a porous material and a filter sidewall 406 is etched or otherwise manufactured (such as molded) out of the base material 404. The filter sidewall 406 can have any shape or dimensions desired, but in some embodiments, the filter sidewall 406 has a series of v-shaped sections that are joined together to form a continuous structure. The v-shaped channels, such as channel 408, are formed by the filter sidewall 406.

The filter substrate 402 can be manufactured from any suitable porous material including, but not limited to charcoal granules, carbon granules, brass particles, zinc particles, copper particles, and porous ceramic materials.

The v-shaped channels are alternating in their positioning to form inlets, such as inlet 410, and outlets, such as outlet 412. To be sure, fluid will enter the inlets and exit from the outlets in a filtered state.

The "V" shape of the filter sidewall 406 divides the inlets from the outlets. The material of the V channels is porous. The porosity allows fluid to pass from the inlet channels to the outlet channels. The size of the porosity controls the flow of particles through the filter.

As mentioned above, the filter sidewall 406 is created from a porous material. The sizes of the holes in the porous material used to manufacture the filter substrate 402 and filter sidewall 406 will dictate a size of particulate matter that can be filtered by the filter device 400. Thus, the smaller the size of the holes in the porous material, the finer particulate matter that can be filtered by the filter substrate 402. Also, the porosity of the material will determine a volume and velocity of the fluid through the filter substrate 402. The porosity of the material will also affect the type of fluid that can be filtered. For example, highly viscous fluids may not effectively filter through porous materials with very fine holes. In some instances, the fluid can be pushed through the filter device 400 under pressure, if needed.

As mentioned above, the filter device 400 is created from a plurality of filter substrates that are stacked together. Layering of the filter substrates support the filtering functions of the filter sidewalls and separates flow into regions and allows for filtering of a fluid from filter substrate to filter substrate (in embodiments where the filter base materials are also porous. In some embodiments inlet/outlet channels of the filter substrates are aligned with one another, although in some embodiments the inlets/outlets of the filter substrates are offset from one another.

In some embodiments, the base material is created from a first, non-porous material. The filter wall can be created from deposition or positioning of the filter sidewall onto the base material. Methods for creating the filter sidewall can include any of the deposition, layering, and etching processes described above.

Figure 12:
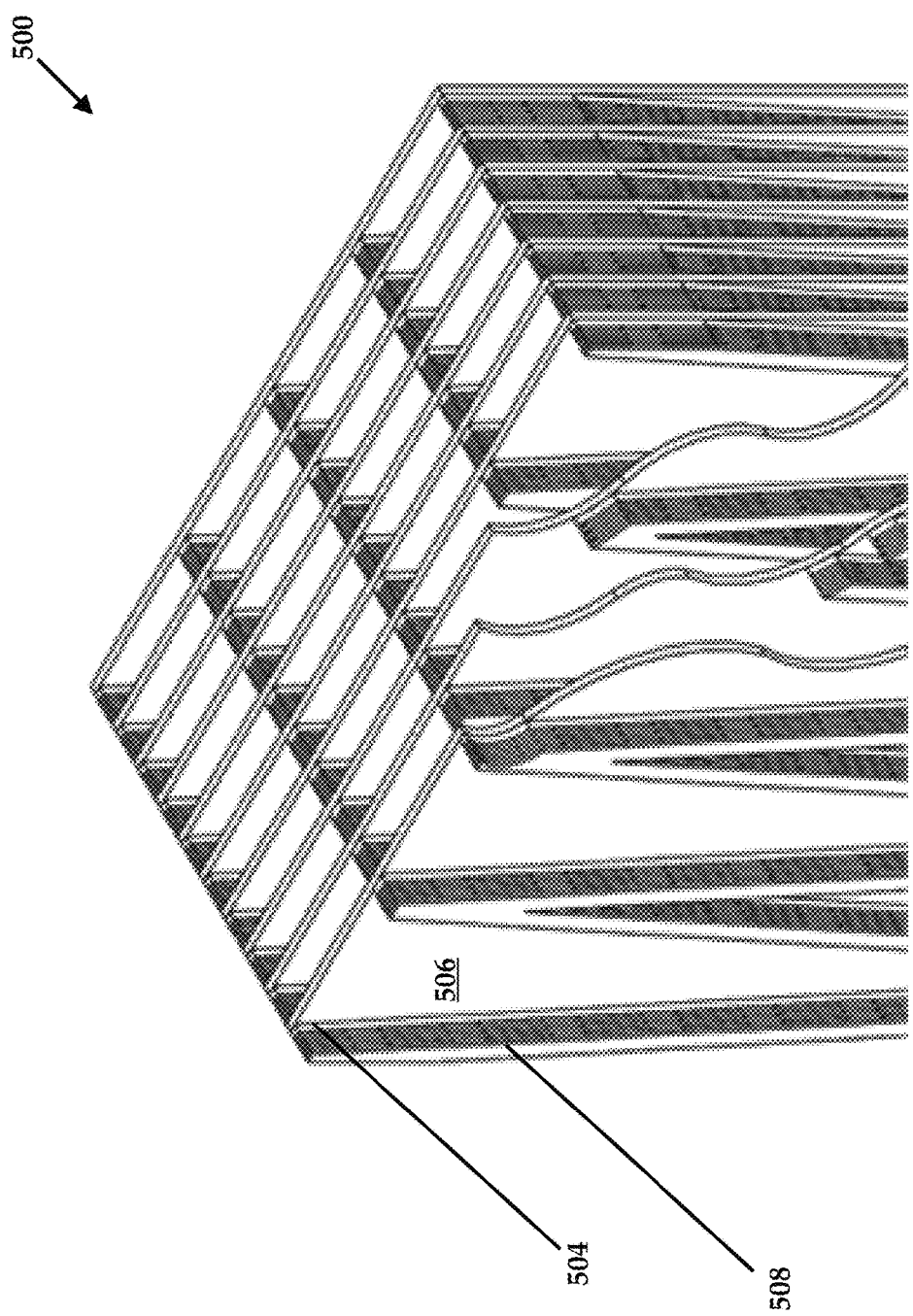
FIGS. 12-14 collectively another example filter device that includes layers of structural material spaced apart from one another with spacer and filter slot layers.
Figure 13:
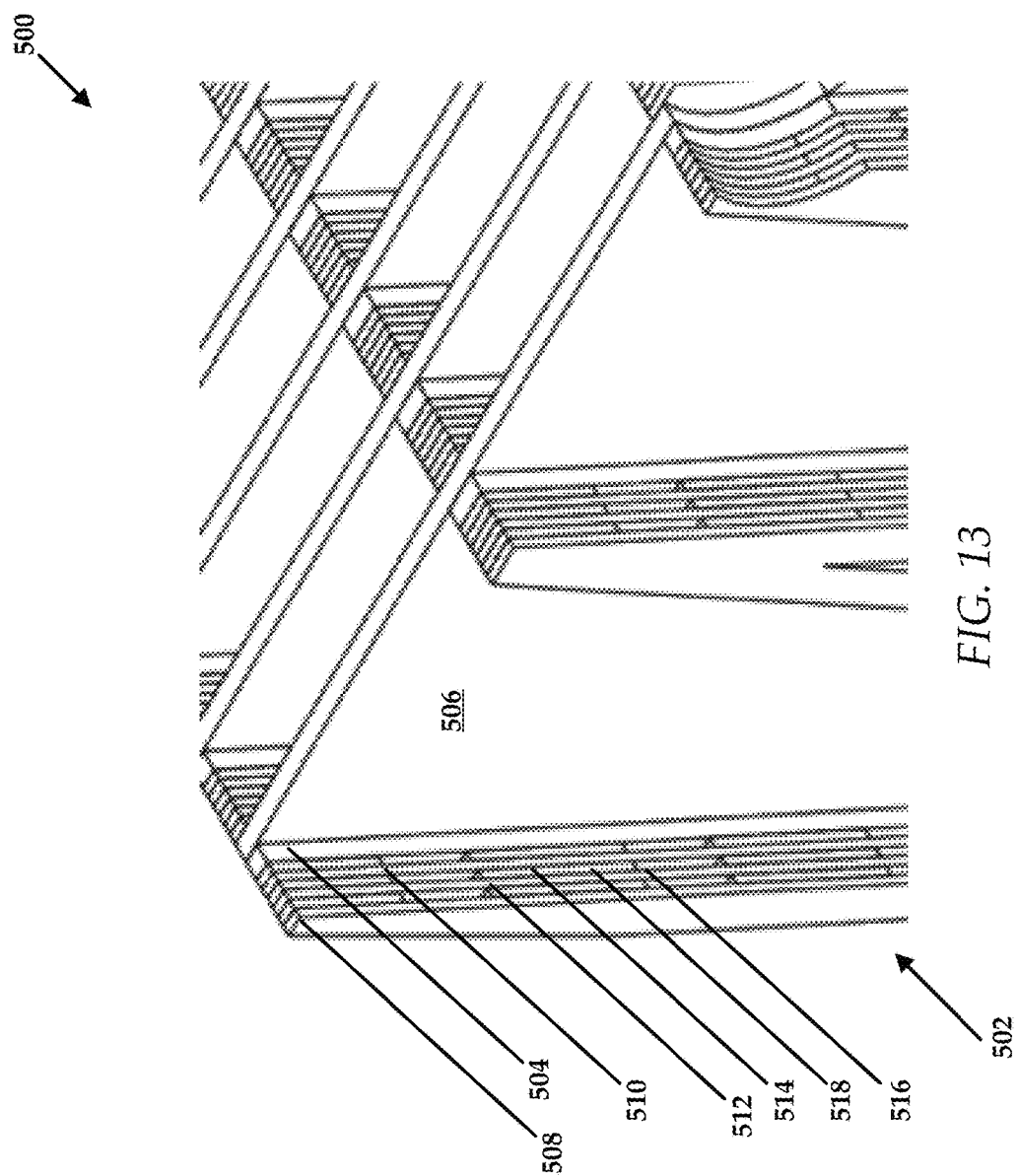
Figure 14:
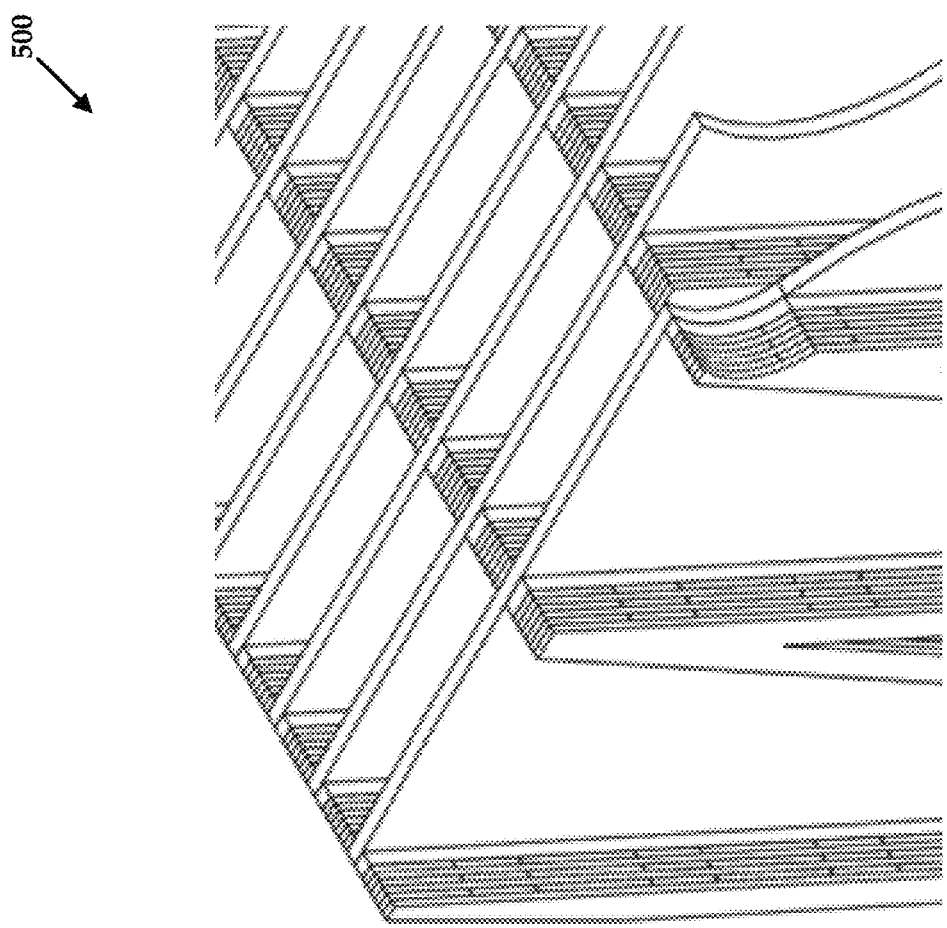

FIGS. 12-14 collectively illustrate another example embodiment of a filter device 500. The filter device 500 is comprised of a plurality of filter substrates, such as filter substrate 502. The filter substrate 502 comprises a initial layer 504 that can be manufactured from any of the materials described herein for use as a base material. In one embodiment, the filter initial layer 504 can be mounted to a base layer 506.

The filter substrate 502 comprises a filter sidewall 508 that is manufactured onto the initial layer 504 by deposition and etching processes, as well as suitable molding or printing processes.

In one embodiment, layers of structural material, such as layers 510 and 512 can be spaced apart from one another with a spacer and filter slot layer 514. The filter sidewall comprises a plurality of these structural layers and spacer and filter slot layers.

In some embodiments, a layer of structural material, such as layer 510 is deposited on the initial layer 504. A portion of the layer 510 is removed by etching or molding to produce the spacer and filter slot layer 514. For example, a plurality of channels are molded into the layer 510 to create filter slots, such as filter slot 516.

In another embodiment, spacers, such as spacer 518 are joined to the layer 510 to create the filter slots. The depth of the channels, or height of the spacers (depending on the embodiment) determine a size of particles that are filtered by the filter substrate 502.

In some embodiments, the filter slots can be filled with a sacrificial material, as described in other embodiments above. In one embodiment, the spacers can be created by printing the spacers and sacrificial material in layers.

Figure 15:
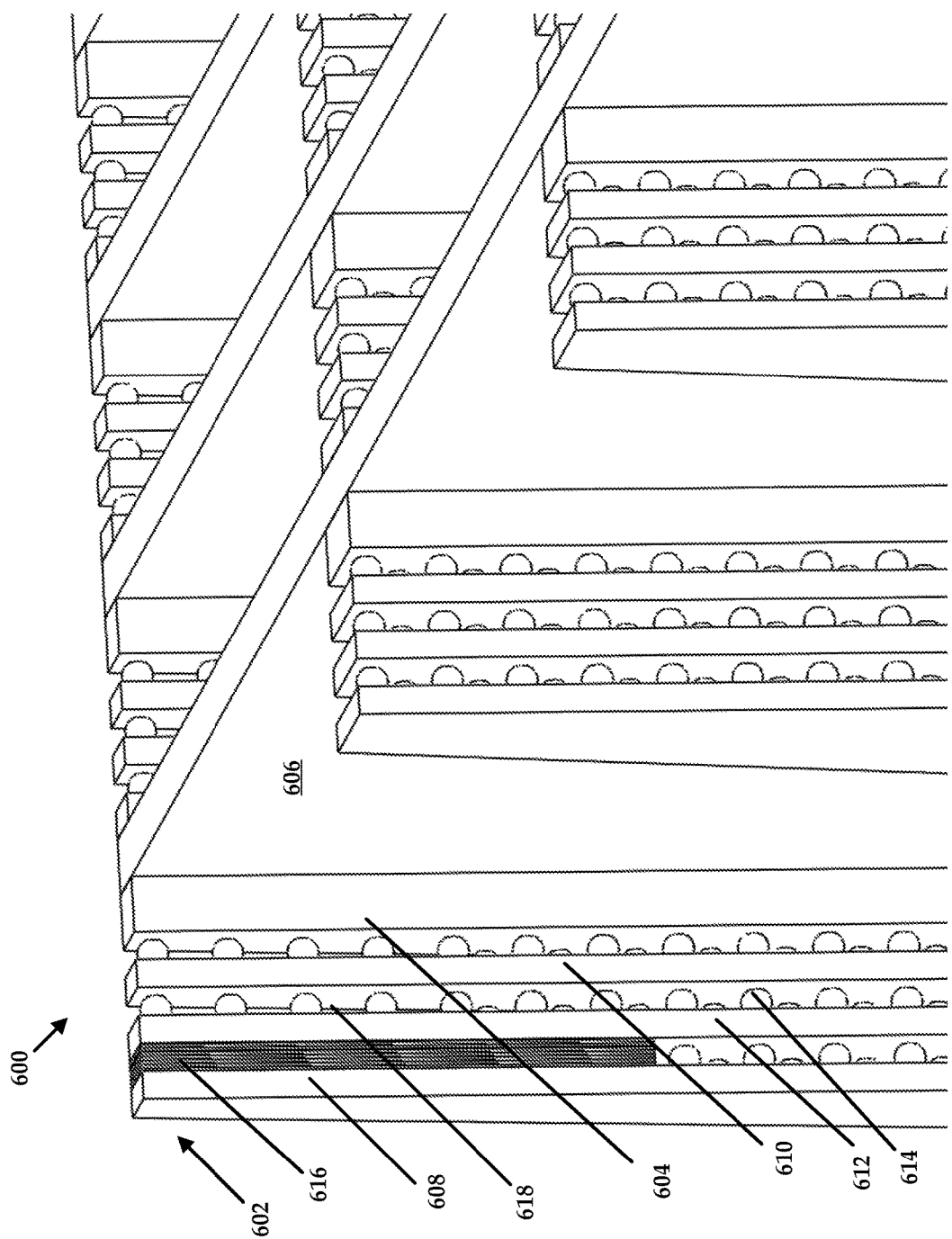
FIG. 15 is a perspective view of another example filter device that comprise layers of structural material and spacer layers, the spacers forming filter slots.

FIG. 15 illustrates another example filter device 600 that is created from a plurality of filter substrates such as filter substrate 602. The filter substrate 602 can include a base material 604 that is applied, in some embodiments, to a substrate panel 606. A filter sidewall 608 created from alternating layers of structural material such as layer 610 and layers of sacrificial material, such as layer 612. Embedded within each of the layers of sacrificial material are spacers such as spacer 614. An example of sacrificial material 616 is illustrated between a set of spacers. To be sure, the sacrificial material extends between the spacers and, when removed, creates filter slots, such as filter slot 618. The size of the filter slots depends on a distance between adjacent spacers, as well as a diameter of the spacers.

As with other embodiments, the filter substrate 602 can be created with a substrate that is subjected to a layering of materials and etched/molded to create the filter sidewall 608. The base material, structural, and sacrificial materials used to create the filter substrate can include any of the materials described herein.

Figure 16:
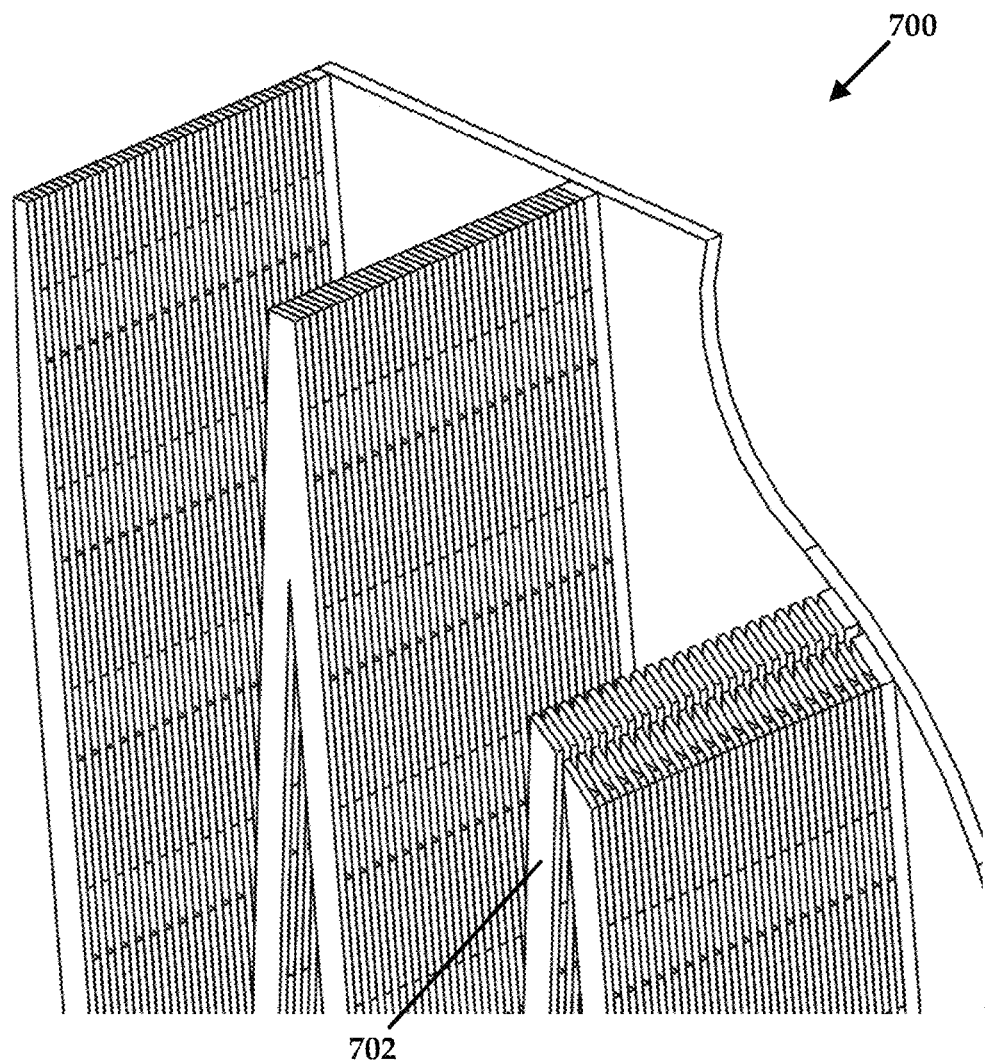
FIG. 16 is a perspective view of another example filter substrate.

FIG. 16 is another example filter substrate 700, where the filter sidewall 702 is illustrated. Only one filter substrate is shown and the filter sidewall 702 is shown to be formed with spacers and structural layers. The filter sidewall 702 could also be made from porous material.

Figure 17:
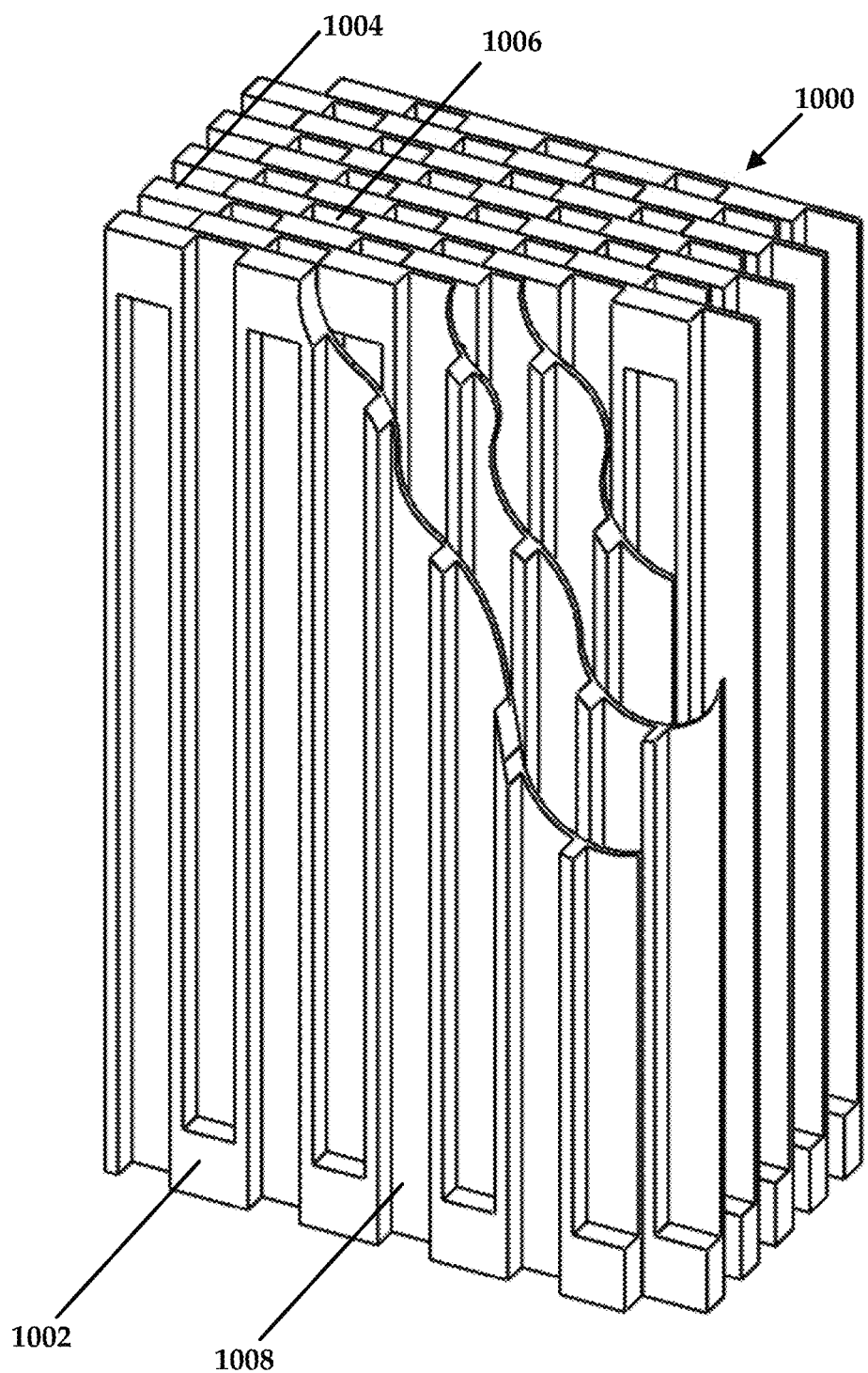
FIG. 17 is a perspective view of another example filter device that comprises u-shaped filter sidewalls and channels.

FIG. 17 illustrates an example filter device 1000 includes a plurality of filter sidewalls, such as filter sidewall 1002. There are no divider substrate panels utilized in this embodiment. Indeed, the filter sidewall 1002 comprises a u-shape that creates rectangular spaces. The filter sidewall 1002 can be directed coupled to other filter sidewalls, such as filter sidewall 1004. In one embodiment, the filter sidewall 1002 is offset from filter sidewall 1004 to create inlets such as inlet 1006. To be sure, filtered fluid will exit the spaces of the filter sidewalls, such as space 1008.

Figures 18, 19, 20:
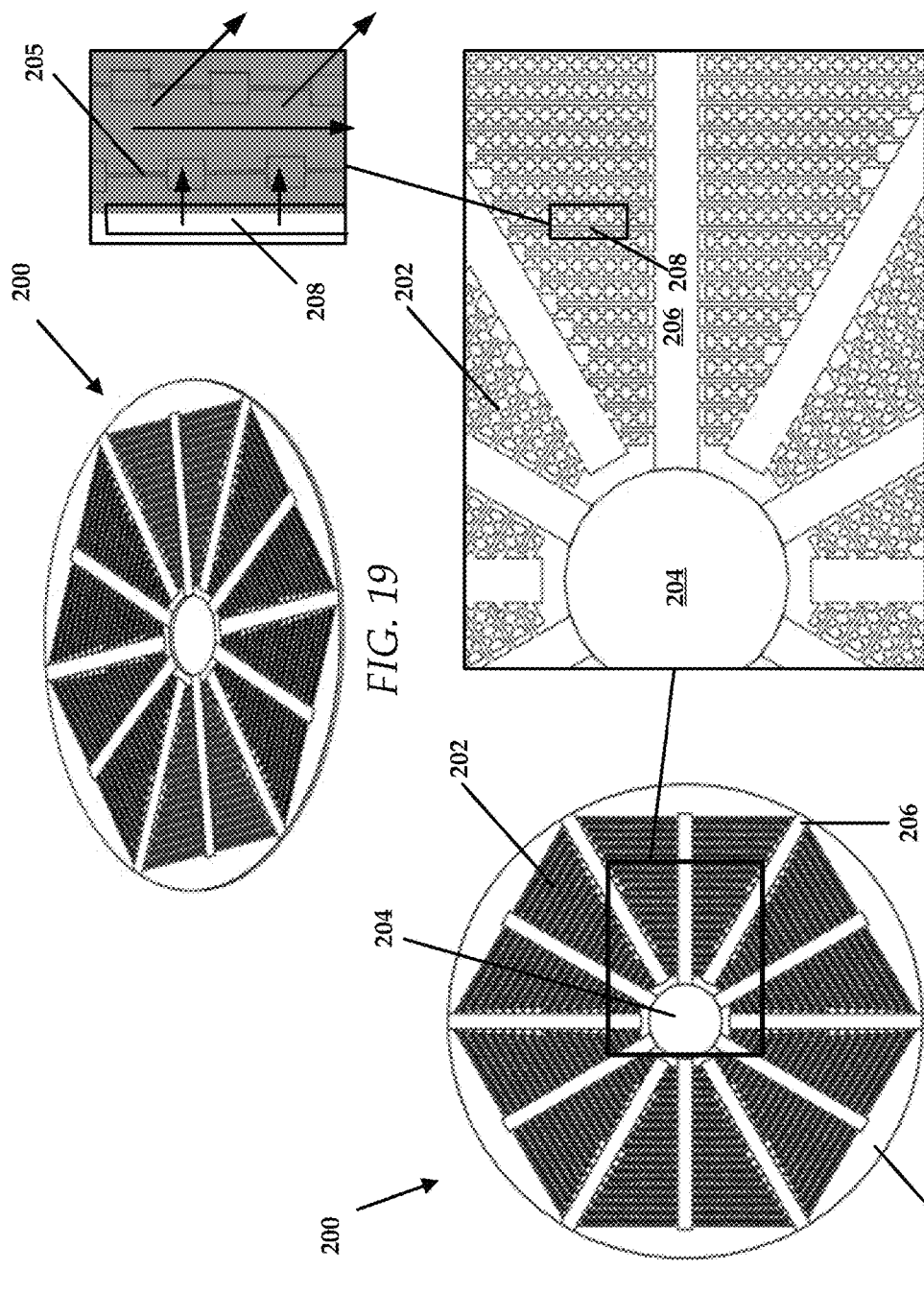
FIGS. 18-20 collectively illustrate an example filter substrate that comprises a plurality of etched cross channels.

FIGS. 18-20 collectively illustrate example filter devices that are constructed from filter substrates as described above. FIGS. 18 and 19 illustrate a filter panel 200 that comprises a plurality of filter substrates, such as filter substrate 202. The filter substrate 202 can include any of the filter substrates described above. The filter substrates are disposed on a structural material 201 that can be fabricated from any of the structural materials described herein.

The filter panel 200 comprises a central aperture 204 that functions as an inlet or outlet port for the filter panel 200. That is, the central aperture 204 can receive a fluid for filtering or can provide an outlet for filtered fluid that has passed through the filter substrates.

The filter substrates are spaced apart by inlet or outlet channels, such as channel 206, also referred to as a large channel. In one embodiment, fluid is provided into the channels and exits through the central aperture 204. In another embodiment, fluid enters the central aperture 204 and exits through each of the channels. In one example, fluid enters the large channel 206 and is passed into smaller channels 208 and ultimately into and through the filter sidewall 205.

FIG. 21 illustrates an example filter device 300 that comprises a plurality of filter panels, such as filter panel 200. The filter panels are stacked such that they align along a central axis X.

A cover panel 302 is utilized on the device 300 to create an enclosure that keeps the fluid contained within the device 300. In some embodiments, the cover panel 302 securely covers the filter panel 200.

Generally, the filter devices described above can be cleaned and reused as needed. For example, the filter devices can be washed with a cleaning fluid such as water or a surfactant bearing fluid to dislodge any particulate matter from the filter slots. The cleaning fluid can be applied to the filter devices under pressure to assist in dislodging particular matter.

It will be understood that any of the filter substrates described herein can be configured for use in a disk or stacked configuration.

It will be understood that while the filter substrates and devices above have been illustrated and described as embodiments for purposes of clarity, any of the features of the any of the embodiments can be utilized to create other additional filter substrates and devices that would apparent to one of ordinary skill in the art with the present disclosure before them. Separate features of different embodiments can be combined together as well.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A filter substrate, comprising:
    a base material;
    deposited alternating layers of sacrificial material between layers of structural material disposed onto the base material creating a layered base material; and
    filter sidewalls etched into the deposited alternating layers of the layered base material, where at least a portion of the layers of sacrificial material between the layers of structural material have been removed to form filter slots in the filter sidewalls, and channels extend between the filter sidewalls, wherein a size of the filter slots is selectable based on a thickness of the layers of sacrificial material utilized.

2. The filter substrate according to claim 1, further comprising a layer of covering layer applied to one or more of the layers of the structural material to enhance filtering.

3. The filter substrate according to claim 2, wherein the covering layer is selected from any of silicone dioxide, titanium dioxide, copper, carbon, and any combinations thereof.

4. The filter substrate according to claim 1, further comprising posts that are deposited on the base material and wherein the filter sidewalls are defined by the posts.

5. The filter substrate according to claim 4, wherein the posts comprise cylindrical segments along the filter sidewalls.

6. The filter substrate according to claim 5, wherein at least a portion of the sides of the cylindrical segments are removed.

7. The filter substrate according to claim 6, wherein a top surface of the filter substrate is planarized.

8. The filter substrate according to claim 1, further comprising a plurality of filter substrates together to form a filter device.

9. The filter substrate according to claim 8, further comprising one or more input and output apertures formed on the filter device, wherein the one or more input and output apertures extend from a top surface of the filter device to a bottom surface of the filter device.

10. The filter substrate according to claim 8, further comprising:
a plurality of substantially v-shaped filter sidewalls assembled into cross channels;
a central aperture inlet that extends from a top surface of the filter device to a bottom surface of the filter device; and
a plurality of inlet/outlet channels between the cross channels.

11. The filter substrate according to claim 1, wherein the base material comprises a material selected from any of silicon, quartz, borosilicate glass, silicone dioxide, glass, silicon nitride, silicon carbon, aluminum, titanium, chromium, molybdenum, tungsten, copper, gold, a photoresist, a polymer, or any combination thereof.

12. The filter substrate according to claim 1, wherein the base material comprises a material selected from any of PET, polycarbonate, or a metal.

13. The filter substrate according to claim 1, wherein the filter sidewalls are etched using any of wet etching, dry etching, laser etching, sintering, cutting via stamping, or any combination thereof.

14. A filter substrate, comprising:
a base material; and
a continuous filter sidewall disposed on the base material, the continuous filter sidewall comprising layers of porous material and layers of sacrificial material and spaces and including an input and an output and outlet sections, the continuous filter sidewall being fabricated so as to comprise filtering elements, wherein fluid entering inlet sections passes through the continuous filter sidewall to remove particulates by the filtering elements and a filtered fluid exits the outlet sections.

15. The filter substrate according to claim 14, wherein when the layers of sacrificial material are removed the spacers remain and extend between the layers of porous material.

* * * * *